United States Patent [19]

Clarke et al.

[11] Patent Number: 4,639,395

[45] Date of Patent: Jan. 27, 1987

[54] PREPASTED WALLCOVERINGS

[75] Inventors: John B. Clarke; John F. Firth, both of West Yorkshire, England

[73] Assignee: Allied Colloids Limited, Great Britain

[21] Appl. No.: 711,615

[22] Filed: Mar. 14, 1985

[30] Foreign Application Priority Data

Mar. 15, 1984 [GB] United Kingdom ............... 8406783

[51] Int. Cl.$^4$ ........................... C09J 7/02; B05D 5/10
[52] U.S. Cl. ................................ 428/341; 427/207.1;
427/372.2; 427/407.1; 427/411; 428/350;
428/355; 428/511; 428/537.5; 428/913.3
[58] Field of Search ............... 428/350, 355, 341, 290,
428/913.3, 343, 511, 537.5, 500; 427/207.1, 411,
407.1, 372.2

[56] References Cited

U.S. PATENT DOCUMENTS 3,122,446  2/1964  Gold et al. ...................... 428/350
4,476,190 10/1984  Clarke et al. ................... 428/350

Primary Examiner—Thomas J. Herbert
Attorney, Agent, or Firm—Jenner & Block

[57] ABSTRACT

A wallcovering comprises a substrate carrying a water-moistenable coating formed of at least two layers. The layer adjacent to the substrate generally comprises unswollen particles of an anionic polymer that is substantially non-swellable in water and that is swellable in aqueous alkali and the upper layer contains an alkali which on contact with water forms an alkaline solution which swells the anionic polymer and a water soluble cationic polymer. The anionic polymer generally comprises beads of cross-linked copolymers of lower alkyl acrylates and methacrylic acid having a molecular weight of about 5 million. Processes for producing the wallcoverings comprise coating the substrate separately with an aqueous dispersion of the anionic polymer and an aqueous solution containing both the cationic polymer and the alkaline material to give at least two separate layers.

16 Claims, No Drawings

PREPASTED WALLCOVERINGS

It has been known for many years to form a prepasted wallcovering comprising a substrate having a water moistenable prepaste coating that, upon moistening with water, becomes adhesive. If the prepaste coating is formed merely by drying onto the substrate an aqueous solution of adhesive it is generally found that the adhesion obtained upon rewetting is inadequate. One way of improving the adhesion is to apply an aqueous solution of adhesive to the substrate and then, before drying it, to scatter onto that dry water moistenable adhesive, so as to increase the amount of adhesive in the prepaste coating.

An improved way of making a prepasted wallcovering is described in U.S. Pat. No. 3,122,446. The process described in that relies upon the use of an anionic polymer that is insoluble in water and that is substantially non-adhesive in the presence of water but which becomes adhesive in the presence of aqueous alkali. It is mentioned in the patent that the polymer can be applied from organic solution and that the alkali can be applied whilst a coating of the polymer is still partially wet, the normal commercial way of operating the process described in that patent comprises applying an aqueous dispersion of the anionic polymer, drying this and then applying a top coat of an alkaline material. Upon contact of the prepaste coating with water the alkali creates an alkaline solution that permeates into the layer of anionic polymer, thereby rendering that layer adhesive.

This system has been widely used but does suffer from a number of deficiencies as regards the properties of the paste upon re-wetting. In particular there is insufficient control of the paste structure, the wet adhesion may be poor, especially if the coating is contacted with water for too long, adhesive may ooze from the edges of the substrate during application of the substrate to the wall or other surface, the working time on porous and plaster surfaces may be too short and the dry adhesion on some surfaces, especially chipboard and gloss paint, may be unsatisfactory.

It has been our object to provide a prepaste wallcovering in which these deficiencies are minimised or eliminated.

A prepasted wallcovering according to the invention comprises a substrate having a water moistenable prepaste coating formed of at least two layers and comprising an anionic polymer that is substantially non-swellable in water and that will swell and become adhesive in the presence of aqueous alkali, an alkaline material that will provide the said aqueous alkali upon contact with water, and a water soluble cationic polymer, in which the anionic polymer and the alkaline material are in separate layers.

The prepaste coating will be formed of at least two layers, one layer comprising the anionic polymer and the other layer comprising the alkaline material. Preferably the alkaline material is in a layer next to the anionic polymer and either in the same layer as the cationic polymer or in a layer next to the cationic polymer. It is generally preferred that the alkaline material is not in direct contact with the subtrate, since some substrates may be damaged by the alkaline material. It is generally preferred to have a film-forming material, that is the anionic and/or the cationic polymer, in direct contact with the substrate and to have water soluble material, e.g., the cationic polymer and/or the alkaline material, in the top layer so that water is able to penetrate the coating. The cationic and anionic polymers can be in the same layer but generally they are in separate layers. It is usually preferred to apply to anionic polymer in the lowermost layer, next to the substrate, and then to apply on this the alkaline material and the cationic polymer in either order or, preferably, in a single layer.

A method of making a prepasted wallcovering comprising a substrate having a water moistenable prepaste coating formed of at least two layers comprises applying onto the substrate an aqueous dispersion of substantially unswollen particles of an anionic polymer that is substantially non-swellable in water and that is swellable in aqueous alkali, an alkaline material and a water-soluble cationic polymer, the anionic polymer and the alkali being in separate layers, and drying the coated substrate.

The cationic polymer is generally applied as an aqueous solution. The alkaline material is generally applied as an aqueous solution. Preferably the cationic polymer and the alkaline material are applied in a single layer as a solution containing them both. The anionic polymer is preferably applied directly on to the substrate substantially unswollen polymer particles typically having a particle size in the range 0.1 to 3 microns, often 0.1–0.4 microns.

The active content of the dispersion of anionic polymer is generally in the range 20 to 40% by weight polymer solids, the active content of the solution of alkaline material is generally in the range 2 to 10% solids and the active content of the cationic polymer solution is generally in the range 1 to 20% polymer solids.

The anionic polymer may be any of the materials described for this purpose in U.S. Pat. No. 3,122,446. Preferably, it is an acrylic polymer, generally a copolymer. Generally it is a cross-linked polymer. Preferred materials are copolymers of alkyl acrylates with acrylic or methacrylic acid, most preferably copolymers of ethylacrylate and methacrylic acid. Suitable copolymers are formed from 60 to 80 parts by weight alkylacrylate (for instance ethylacrylate or a blend of methyl acrylate and ethyl acrylate) and 40 to 20 parts by weight methacrylic acid. Its molecular weight may be 2 to 8 million, generally about 5 million.

The cationic polymer generally is incapable of causing the anionic polymer to become adhesive but if it can make the anionic polymer adhesive then it should be applied in a layer separate from the anionic polymer. It will normally have a molecular weight in the range from 10,000 to 500,000. A wide range of cationic polymers are usable and include ethylene diamine-epichlorhydrin polymers, polyethylene imine, diallyl quaternary ammonium halide polymers such as diallyl dimethyl ammonium chloride homopolymers and copolymers, for instance with acrylamide, and homopolymers, and copolymers with acrylamide or other comonomer, of salts (generally quaternary salts) of dialkylaminoalkyl acrylates or methacrylates (preferably dimethyl- or diethyl-aminoethyl acrylate or methacrylate) or dialkylaminoalkyl acrylamide or methacrylamide (preferably dimethylaminopropylmethacrylamide).

The alkaline material may for instance be sodium bicarbonate, sodium hydroxide or potassium hydroxide.

The solutions may be applied to the substrate in conventional manner either by a single path through a coating apparatus having two (or three) separate coating stations or by sequential passes through coating apparatus that applies a single layer at a time. The dry weight of anionic polymer is preferably from 3 to 20, most preferably 6 to 10 g/m². The dry weight of alkaline material is preferably from 0.2 to 5, most preferably 0.5 to 2 g/m². The dry weight of cationic polymer is preferably from 0.1 to 3, most preferably 0.2 to 2 g/m².

The substrate may be any of the substrates conventionally used in prepasted wallcoverings.

The following are examples. Example 1 is typical of present commercial products and Example 5 is a comparative example.

EXAMPLE 1

A 30% solids content aqueous dispersion of a cross-linked copolymer of 70 parts by weight ethyl acrylate and 30 parts by weight methacrylic acid was applied onto wallpaper base stock and dry coating weight of 7 to 9 g/m² and dried by forced draught oven at 100° C. A 5% aqueous solution of sodium carbonate was applied over this coating at a dry coating weight of 1 g/m² and dried by the above method.

EXAMPLE 2

The process of Example 1 was repeated except that the sodium carbonate solution also contained 1% polyethylene imine to give a dry coating weight of 0.2 g/m² of the imine.

EXAMPLE 3

The process of Example 2 was repeated except that the sodium carbonate solution contained 5% polyethylene imine to give a dry coating weight of 1 g/m².

EXAMPLE 4

A process as in Example 1 was conducted except that sodium hydroxide was used in place of sodium carbonate and a 5% by weight solution of an ethylene diamine-epichlorhydrin polymer was then applied to give a dry coating weight of 1 g/m².

EXAMPLE 5

A process was conducted according to Example 1 except that the sodium carbonate solution was replaced with a 5% solution of a polymer of ethylene diamine and epichlorhydrin to give a dry coating weight of 1 g/m².

Each of the coated substrates was soaked in water for 30 seconds. The weight of water picked up by the coating was recorded and the structure of the coating was observed on a scale of 0 to 5, 0 being poor and 5 excellent and it was noted whether the structure was wet (W) or tight (T). A sample of the coated substrate was brushed onto a surface and edge ooze was recorded, 0 being very low (good) and 5 very high. The wet adhesion, dry adhesion on various surfaces and the working times were all recorded on a scale of 0 (very poor) to 5 (excellent). When the adhesion was so strong that the paper was destroyed during removal the value was recorded as D. The results are shown in the following table.

|  | Ex. 1 | Ex. 2 | Ex. 3 | Ex. 4 | Ex. 5 |
|---|---|---|---|---|---|
| Water Pick Up | 433 gms | 372 gms | 340 gms | 430 gms | 100 gms |
| Structure | 3W | 4T | 4T | 4T | 0 |
| Edge Ooze | 3 | ½ | 1 | 1 | 0 |
| Wet Adhesion | 2 | ⅔ | ⅔ | 3 | 0 |
| Working time | 2 | 4 | 4 | 4 | 0 |

-continued

|  | Ex. 1 | Ex. 2 | Ex. 3 | Ex. 4 | Ex. 5 |
|---|---|---|---|---|---|
| chipboard Dry Adhesion | 2 | ¾D | 4/5D | 4/5D | 0 |
| Chipboard Dry Adhesion Gloss | 2 |  | 5D |  |  |
| Dry Adhesion Emulsion Paint | 5D |  | 5D |  |  |
| Dry Adhesion Plaster | 5D |  | 5D |  |  |

These results clearly demonstrate that the products of the invention, Examples 2 to 4, have the best combination of properties.

We claim:

1. A prepasted wallcovering comprising a substrate carrying a water-moistenable prepaste coating formed of at least two layers and consisting essentially of an anionic polymer that is substantially non-swellable in water and that is swellable in the presence of aqueous alkali, the anionic polymer being present in an amount in the range of 3 to 20 grams per square meter of substrate, an alkaline material that on contact with water will form said aqueous alkali, said alkaline material being present in an amount in the range of 0.2 to 5.0 grams per square meter of substrate and a water-soluble cationic polymer present in an amount in the range of from 0.1 to 3.0 grams per square meter of substrate, said anionic polymer and said alkaline material being in separate layers.

2. A wallcovering according to claim 1 in which said anionic polymer is in direct contact with the substrate.

3. A wallcovering according to claim 1 in which said alkaline material is in contact with both the anionic polymer and the cationic polymer.

4. A wallcovering according to claim 1 in which the anionic polymer is in direct contact with the substrate and the cationic polymer and the alkaline material are present in a single layer above the layer containing the anionic polymer.

5. A wallcovering according to claim 1 in which the anionic polymer comprises substantially unswollen particles of a cross-linked acrylic polymer having a molecular weight in the range 2 to 8 million.

6. A wallcovering according to claim 1 in which said acrylic polymer comprises substantially unswollen particles of a cross-linked acrylic polymer having a molecular weight in the range 2 to 8 million and is formed from 60 to 80 parts by weight alkyl acrylate with 40 to 20 parts by weight (meth) acrylic acid.

7. A wallcovering according to claim 1 in which the cationic polymer has a molecular weight in the range 10,000 to 50,000 and is selected from the group consisting of ethylene diamine-epichlorhydrin polymers, polyethylene imine, diallyl quaternary ammonium halide polymers, polymers of dialkyl amino alkyl(meth)acrylates, their salts and quaternary derivatives and polymers of dialkyl amino alkyl(meth)acrylamides, their salts and quaternary derivates.

8. A wallcovering according to claim 1 characterised in that the anionic polymer is present in an amount in the range 6 to 10 grams per square meter of substrate, the alkaline material is present in an amount in the range 0.5 to 2.0 grams per square meter of substrate and the cationic polymer is present in an amount of from 0.2 to 2.0 grams per square meter of substrate.

9. A process for producing a wallcovering comprising a substrate carrying a water-moistenable prepaste coating formed of at least two layers and consisting essentially of an anionic polymer which is substantially non-swellable in water and is swellable in aqueous alkali, the anionic polymer being present in an amount in the range of 3 to 20 grams per square meter of substrate, an alkaline material that on contact with water will form said aqueous alkali, said alkaline material being present in an amount in the range of 0.2 to 5.0 grams per square meter of substrate and a water-soluble cationic polymer present in an amount in the range of 0.1 to 3.0 grams per square meter of substrate, said process comprising applying an aqueous dispersion of substantially unswollen particles of the anionic polymer to the substrate in one of said layers, applying the cationic polymer to the substrate from aqueous solution, applying the alkaline material to the substrate from aqueous solution and drying the coated substrate.

10. A process according to claim 9 in which the anionic polymer dispersion is applied directly onto the substrate.

11. A process according to claim 9 in which in the coated substrate the alkaline material is in contact with both the anionic polymer and the cationic polymer.

12. A process according to claim 9 in which the anionic polymer dispersion is applied directly onto the substrate and the cationic polymer and the alkaline material are applied in a single layer on the layer of anionic polymer from a single aqueous dispersion.

13. A process according to claim 9 in which the anionic polymer dispersion comprises substantially unswollen particles of a cross-linked acrylic polymer having a molecular weight in the range of 2 to 8 million.

14. A process according to claim 9 in which the anionic polymer dispersion comprises substantially unswollen particles of a cross-linked acrylic polymer having a molecular weight in the range of 2 to 8 million and is formed from 60 to 80 parts by weight alkyl acrylate with 40 to 20 parts by weight (meth) acrylic acid.

15. A process according to claim 9 in which the cationic polymer has a molecular weight in the range of 10,000 to 50,000 and is selected from the group consisting of ethylene diamine-epichlorhydrin polymers, polyethylene imine, diallyl quaternary ammonium halide polymers, polymers of dialkyl amino alkyl(meth)acrylates, their salts and quaternary derivatives and polymers of dialkyl amino alkyl(meth)acrylamides, their salts and quaternary derivatives.

16. A process according to claim 9 in which the anionic polymer is applied in an amount of from 6 to 10 grams dry particles per square meter of substrate, the alkaline material is applied in an amount in the range 0.5 to 2.0 grams per square meter of substrate and the cationic polymer is applied in an amount of from 0.2 to 2.0 grams per square meter of substrate.

* * * * *